United States Patent
Stallmann

(10) Patent No.: US 9,777,961 B2
(45) Date of Patent: Oct. 3, 2017

(54) METHOD AND INSTALLATION FOR LIQUEFYING FLUE GAS FROM COMBUSTION INSTALLATIONS

(75) Inventor: Olaf Stallmann, Essenheim (DE)

(73) Assignee: General Electric Technology GmbH, Baden (CH)

( * ) Notice: Subject to any disclaimer, the term of this patent is extended or adjusted under 35 U.S.C. 154(b) by 59 days.

(21) Appl. No.: 13/581,871

(22) PCT Filed: Feb. 11, 2011

(86) PCT No.: PCT/IB2011/000263
§ 371 (c)(1),
(2), (4) Date: Nov. 21, 2012

(87) PCT Pub. No.: WO2011/107840
PCT Pub. Date: Sep. 9, 2011

(65) Prior Publication Data
US 2013/0167583 A1    Jul. 4, 2013

(30) Foreign Application Priority Data
Mar. 3, 2010    (EP) .................................... 10002158

(51) Int. Cl.
*F25J 3/06*    (2006.01)
*B01D 53/00*    (2006.01)

(52) U.S. Cl.
CPC ............ *F25J 3/067* (2013.01); *B01D 53/002* (2013.01); *B01D 2257/504* (2013.01); *F25J 2210/70* (2013.01); *F25J 2220/82* (2013.01); *F25J 2230/80* (2013.01); *F25J 2235/80* (2013.01); *F25J 2240/90* (2013.01); *F25J 2260/80* (2013.01); *F25J 2270/02* (2013.01); *F25J 2270/04* (2013.01); *Y02C 10/12* (2013.01); *Y02E 20/326* (2013.01)

(58) Field of Classification Search
CPC .. F25J 2220/40; F25J 2215/80; F25J 2210/70; F25J 2210/80; F25J 3/0266; F25J 3/067; F25J 2220/80; F25J 2220/84; F25J 2230/80; F25J 2260/80; F25J 2270/80
USPC .......................................... 62/617, 619, 927
See application file for complete search history.

(56) References Cited

U.S. PATENT DOCUMENTS

| | | | | |
|---|---|---|---|---|
| 5,233,837 A | * | 8/1993 | Callahan .............. | B01D 53/229 60/648 |
| 6,212,906 B1 | | 4/2001 | Lau et al. | |
| 2007/0245771 A1 | * | 10/2007 | Spilsbury ........................ | 62/620 |
| 2008/0173585 A1 | * | 7/2008 | White .................. | B01D 53/002 210/656 |
| 2008/0196584 A1 | | 8/2008 | Ha | |

(Continued)

FOREIGN PATENT DOCUMENTS

| FR | 2 884 305 | 10/2006 |
|---|---|---|
| FR | 2 918 579 | 1/2009 |

OTHER PUBLICATIONS

"Oxyfuel Conversion of Heaters and Boilers for CO2 Capture", Wilkinson, et al., Second National Conference on Carbon Sequestration, May 5-8, 2003.

*Primary Examiner* — Frantz Jules
*Assistant Examiner* — Brian King
(74) *Attorney, Agent, or Firm* — GE Global Patent Operation; Cynthia W. Flanigan

(57) ABSTRACT

A method and a plant for producing liquid $CO_2$ from flue gas as described with reduced energy consumption and a stable behavior.

11 Claims, 2 Drawing Sheets

(56) References Cited

U.S. PATENT DOCUMENTS

| | | | |
|---|---|---|---|
| 2008/0196587 A1* | 8/2008 | Ha | F25J 3/0266 95/204 |
| 2008/0245101 A1* | 10/2008 | Dubettier-Grenier et al. | 62/636 |
| 2009/0013717 A1 | 1/2009 | Darde et al. | |
| 2010/0018248 A1* | 1/2010 | Fieler et al. | 62/617 |

* cited by examiner

METHOD AND INSTALLATION FOR LIQUEFYING FLUE GAS FROM COMBUSTION INSTALLATIONS

BACKGROUND

The present disclosure relates to a method and a device for the liquefaction of the $CO_2$ contained in the flue gases.

Most cryogenic methods for the production of $CO_2$ out of combustion flue gases use conventional separation schemes having two or more separation stages. In FIG. 1 such an installation is shown as block diagram.

In the FIGS. 1 and 2 the temperature and the pressure at various points of the flue gas stream as well as of the $CO_2$ are indicated by so-called flags. The temperatures and the pressures belonging to each flag are compiled in a chart in the following. It is obvious for a man skilled in the art that these temperatures and pressures are meant as an example. They can vary depending on the composition of the flue gas, the ambient temperature and the requested purity of the liquid $CO_2$.

In a first compressor 1 the flue gas is compressed. This compression can be a multi-stage compression process with coolers and water separators between each compression stage (not shown) separating most of the water vapour resp. water from the flue gas.

In FIG. 1 the flue gas stream is designated with reference numeral 3. When being emitted by the first compressor 1 the flue gas has a temperature significantly higher than the ambient temperature and then is cooled to approximately 13° C. by a first cooler 5. The pressure is approximately 35.7 bar.

The moisture still contained in the flue gas stream 3 is freed from water by a suitable drying process e.g. adsorption dried in a drier 7 and subsequently conveyed to a first separation stage 9. This first separation stage 9 comprises a first heat exchanger 11 and a first separation drum 13. The first heat exchanger 11 serves for cooling the flue gas stream 3. As a result of this cooling a partial condensation of the $CO_2$ contained in the flue gas stream 3 takes place. Consequently, the flue gas stream 3 enters the first separation drum 13 as a two-phase mixture. There the liquid phase and the gaseous phase of the flue gas stream are separated by means of gravitation. In the first separation drum the pressure is approximately 34,7 bar and the temperature is −19° C. (cf. flag no. 5).

At the bottom of the first separation drum 13 liquid $CO_2$ is extracted and via a first pressure reducing valve 15.1 expanded to a pressure of approximately 18.4 bar (cf. ref. No. 3.1). This results in a temperature of the $CO_2$ between −22° C. and −29° C. (cf. flag no. 10). The partial $CO_2$ stream 3.1 of the flue gases is heated and evaporated in the first heat exchanger 11 by the flue gas stream 3. At the exit of the first heat exchanger 11 the partial stream 3.1 has a temperature of approximately 25° C. and a pressure of approximately 18 bar (cf. flag no. 11).

When the second partial stream 3.2 being extracted at the head of the first separation drum 13 is followed it becomes clear that this partial stream 3.2 being extracted from the first separation drum 13 in a gaseous state is cooled in a second heat exchanger 17 and partially condensed. Afterwards this partial stream 3.2 being also present as two-phase mixture is conveyed to a second separation drum 19. The second heat exchanger 17 and the second separation drum 19 are the main components of the second separation stage 21.

In the second separation drum 19 again a gravity-supported separation between the liquid phase and the gaseous phase of the partial stream 3.2 takes place. In the second separation drum 19 there is a pressure of approximately 34,3 bar and a temperature of approximately −50° C. (cf. Flag no. 11).

The gaseous phase in the second separation drum 19, the so-called offgas 23, is extracted at the head of the second separation drum 19, expanded to approximately 17 bar in a second pressure reducing valve 15.2, so that it cools down to approximately −54° C.

In the figures the offgas is designated with reference numeral 23. The offgas 23 streams through the second heat exchanger 17 thereby cooling the flue gas 3.2 in the counter stream.

At the bottom of the second separation drum 19 liquid $CO_2$ is extracted and expanded to approximately 17 bar in a third pressure reducing valve 15.3, so that it reaches a temperature of −54° C. as well (cf. flag no. 7a). This partial stream 3.3 as well is conveyed to the second heat exchanger 17. Wherein a part of the liquid $CO_2$ evaporates and a partial stream 3.3.1 is extracted from the second heat exchanger 17, expanded to approximately 5 to 10 bar in a fourth pressure reducing valve 15.4, so that here as well a temperature of −54° C. is reached (cf. flag no. 7b), and again conveyed to the second heat exchanger 17.

After the partial stream 3.3.1 streamed through the second heat exchanger 17, it again is brought together with the partial stream 3.3 and conveyed to the first heat exchanger 11. At the entrance of the first heat exchanger 11 this partial stream has a pressure of approximately 5 to 10 bar with a temperature of −22 to −29° C. (cf. flag no. 14).

This partial stream 3.3 takes up heat in the first heat exchanger 11, so that at the exit of same it has a temperature of approximately −7° C. with a pressure of approximately 5 to 10 bar. The third partial stream 3.3 is conveyed to a second compressor 25 at the first compressor stage, whereas the partial stream 3.1 having a pressure of approximately 18 bar is conveyed to the second compressor stage at the three-stage compressor 25 shown in FIG. 1.

Intercooler between the various stages of the second compressor 25 and an aftercooler for the compressed $CO_2$ are not shown in FIG. 1.

At the exit of the second compressor 25 the compressed $CO_2$ has a pressure of between 60 bar and 110 bar with temperatures of 80° C. to 130° C. In the aftercooler, which is not shown, the $CO_2$ is cooled down to ambient temperature.

If necessary the $CO_2$ can be either fed directly into the pipeline or liquefied and conveyed from a first $CO_2$ pump 27 e.g. into a pipeline (not shown). The first $CO_2$ pump 27 raises the pressure of the liquid $CO_2$ to the pressure given in the pipeline.

Going back to the offgas 23 it can be seen that the offgas streams through the second heat exchanger 17 and the first heat exchanger 11, thereby taking up heat from the flue gas stream 3. At the exit of the first heat exchanger 11 the offgas has a temperature of approximately 26° C. to 30° C. with a pressure of approximately 26 bar (cf. flag no. 16).

For maximising the energy recovery it is known to overheat the offgas 23 with an offgas superheater 29 and then convey it to a expansion turbine 31 or any other expansion machine. Wherein mechanical energy is recycled and afterwards the offgas is emitted into the surroundings with a low pressure approximately corresponding to the surrounding pressure.

This installation described by means of FIG. 1 for liquefying $CO_2$ is relatively simple and works without problems. The disadvantage of this method and this installation for the production of liquid $CO_2$ out of flue gas of power plants e.g. fuelled with fossils is its high energy demand having negative effects on the net efficiency degree of the power plant.

SUMMARY

The present invention provides a method and an installation for liquefying the $CO_2$ contained in the flue gas operating with a reduced energy demand and thus increasing the net efficiency degree of the power plant.

At the same time the method is simple and the operation technique favourably controllable in order to guarantee a robust and trouble-free operation.

According to an embodiment of the present invention, these advantages are accomplished by conveying the partial stream 3.2 of the liquid $CO_2$ after the exit out of the second heat exchanger 17 to a third separation drum having a pressure of approximately 16,5 bar with a temperature of −47° C. Here again a separation of the liquid and the gaseous phase takes place and a considerable part of the liquid phase is increased in pressure by a second $CO_2$ pump (cf. flag no. 7e), afterwards expanded and can thus be used for cooling in the second heat exchanger. However, this partial stream must be expanded to only 20 bar, so that it can be conveyed together with the liquid phase from the first separation drum to the first heat exchanger and afterwards conveyed to the second compressor stage of the second compressor.

One advantage of this method is that only a smaller part of the liquid $CO_2$ of the liquid $CO_2$ present at the last separation stage has to be expanded to a pressure of 5 to 10 bar. It is rather possible to expand a considerably bigger part of the liquid $CO_2$ to a pressure of approximately 18 bar so that this increased part can be injected in the second compression stage of the second compressor. This results in a considerable reduction of the required power for the second compressor 25 having the direct effect of an improved net efficiency degree of the upstream power plant. The same applies to the method claims 8 to 10. The advantages of the subclaims are explained in connection with FIG. 2 in the following.

BRIEF DESCRIPTION OF THE DRAWINGS

Referring to the drawings, wherein like items are numbered alike in the various Figures:

In FIG. 2 identical components are designated with identical reference numerals. The statements concerning FIG. 1 correspondingly apply.

DETAILED DESCRIPTION

Figure 1:
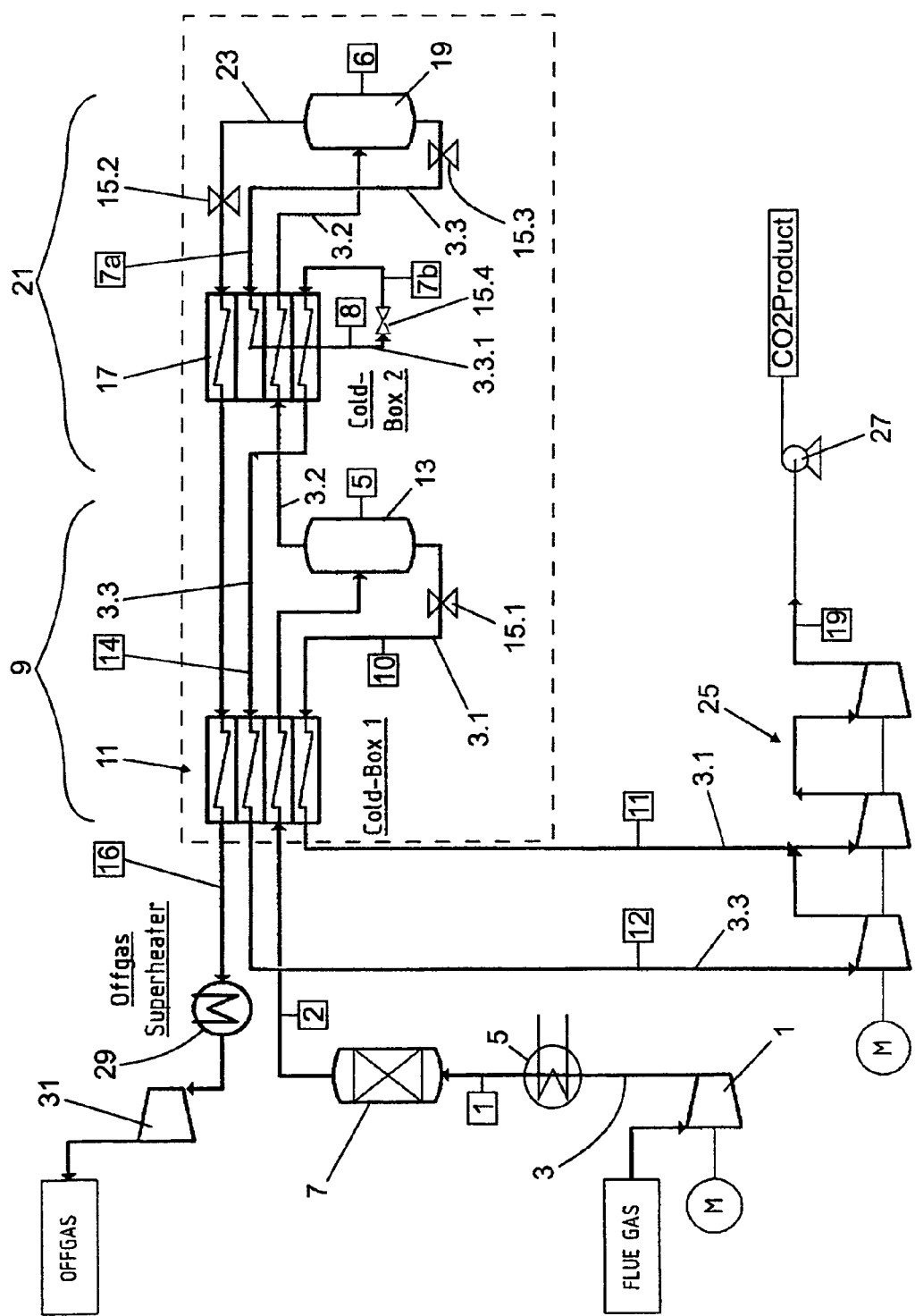
FIG. 1 depicts an installation for $CO_2$ liquefaction out of flue gases according to the prior art and FIG. 2 depicts an embodiment of the installation for $CO_2$ liquefaction according to the invention.
Figure 2:
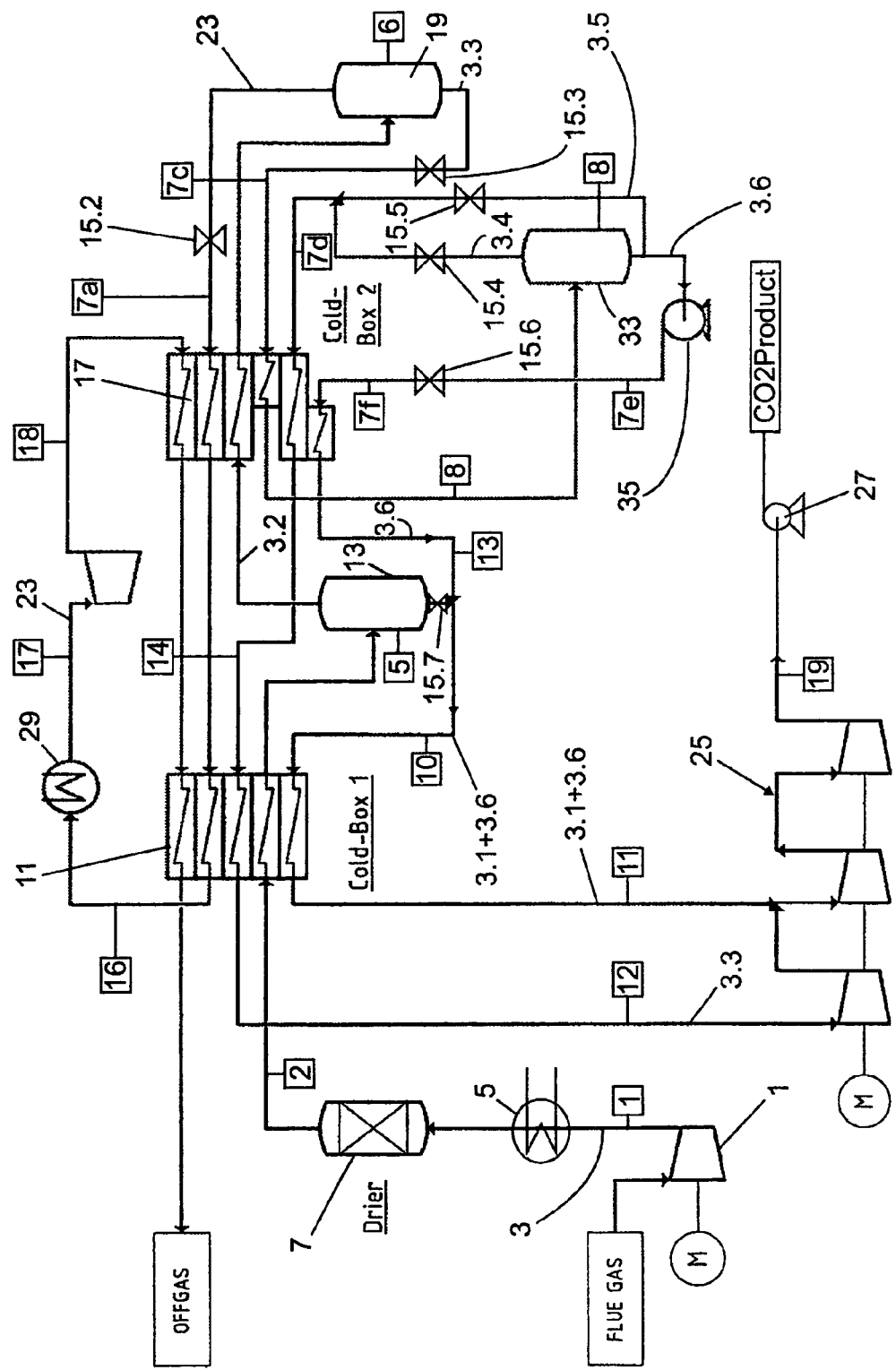

Referring to FIG. 2, treatment of the flue gas stream 3 in the first compressor 1, the first cooler 5, the drier 7, the first heat exchanger 11 and the first separation drum 13 exactly takes place as described by means of FIG. 1. As well, the gaseous phase 3.2 is extracted at the head of the first separation drum 13, as explained in FIG. 1, transported through the second heat exchanger 17 and then conveyed to the second separation drum 19. The two phases (liquid and gaseous) of the partial stream 3.2 are divided in the second separation drum 19 into the offgas stream 23 and liquid $CO_2$.

At the bottom of the second separation drum 19 this partial stream is extracted and has the reference numeral 3.3 such as in FIG. 1.

As already explained by means of FIG. 1, the partial stream 3.3 is expanded to a pressure of 15,5 bar in a third pressure reducing valve 15.3, thereby cooling down to −54° C. The partial stream 3.3 streams through the second heat exchanger 17, thereby taking up heat from the partial stream 3.2 of the flue gas and enters with a temperature of approximately −47° C. (cf. flag no. 8) and is conveyed into a third separation drum 33.

There the partially liquid and partially gaseous $CO_2$ has a pressure of approximately 16,5 bar and a temperature of −47° C. (cf. flag no. 9).

At the head of the third separation drum 33 the gaseous phase is extracted and expanded in a fourth pressure reducing valve 15.4. The gaseous partial stream being extracted at the head of the third separation drum 33 is designated with reference numeral 3.4 in FIG. 2. At the foot of the third separation drum 33 a smaller liquid partial stream 3.5 is extracted and expanded in a fifth pressure reducing valve 15.5. Subsequently the partial streams 3.4 and 3.5 are brought together again. Then they have a pressure of approximately 5 to 10 bar and a temperature of −54° C. (cf. flag no. 7d).

The liquid $CO_2$ present in the third separation drum 33 is brought to an increased pressure level of approx. 20 bar to 23 bar in a sixth partial stream 3.6 by a second $CO_2$ pump 35 (cf. flag no. 7e)

In a sixth pressure reducing valve 15.6 the $CO_2$ which has been liquid so far is expanded to a pressure of approximately 20 bar, with a temperature of −45° C. With this partially liquid, partially gaseous $CO_2$ the flue gas stream 3.2 in the second heat exchanger 17 is cooled. As the entrance temperature of the partial stream 3.6 is higher than the entrance temperatures of the offgas 23 as well as the partial stream 3.3, the partial stream 3.2 first is cooled with the partial stream 3.6. Thus it is possible to take up heat from the partial stream 3.2 even with this higher temperature of −47° C. In FIG. 2 as well this fact can be graphically clearly seen.

The partial stream 3.2 leaves the second heat exchanger 17 with a temperature of approximately −22° C. to −29° C. and is brought together with the partial stream 3.1 extracted before from the first separation drum 13. As there is a pressure of approximately 34.5 bar in the first separation drum 13, the liquid partial stream 3.1 from the first separation drum 13 is expanded to approximately 20 bar in a seventh pressure reducing valve 15.7. These two partial streams 3.1 and 3.6 brought together enter the first heat exchanger 11 with a temperature of approximately −22° C. to −29° C. (cf. flag no. 10), thereby taking up heat from the flue gas stream 3. They leave the first heat exchanger (cf. flag no. 11) with a temperature of approximately 25° C. and a pressure of approximately 18 bar and can thus be conveyed to the second compression stage of the second compressor 25.

As the partial streams 3.1 and 3.6 can be conveyed to the second compression stage of the second compressor 25, the partial stream 3.3, which has to be conveyed to the first compression stage of the second compressor 25, is correspondingly reduced. Consequently the power required by the second compressor 25 is smaller. This has positive effects on the energy demand of the installation according to the invention.

A second possibility of reducing the energy demand of the $CO_2$ liquefaction plant can be seen in not only overheating the offgas 23 in the offgas superheater 19 after the exit from the first heat exchanger 11, but also re-conveying it to the second heat exchanger 17 after the expansion in the expansion turbine 31. After the overheating the offgas has a temperature of approximately 80° C. to approximately 100° C. with a pressure of approximately 26 bar (cf. flag no. 17). By the expansion in the expansion machine 31 the pressure drops to 2.3 bar and the offgas reaches a temperature of −54° C. Thus the offgas can once more contribute to the cooling of the flue gas stream 3 resp. the partial stream 3.2. Afterwards the offgas can be emitted to the surroundings with a low pressure and approximately surrounding temperature. It is also possible to carry out a multi-stage expansion and overheating of the offgas 23 (not shown in FIG. 2).

This as well results in a considerable reduction of the energy demand of the installation according to the invention, as on the one hand the offgas 23 contributes to a greater amount to the cooling of the flue gas stream 3 resp. the partial stream 3.2 and the expansion machine 31 generates mechanical work, which e.g. can be used for driving the first compressor 1 or the second compressor 25. All in all it can be stated that the method according to the invention and the installation for $CO_2$ liquefaction required for carrying out the method according to the invention are still relatively simple in their design in spite of the considerable advantages.

A further advantage is that the partial stream 3.6 is expanded to a pressure with which it is possible to bring it together with the partial stream 3.1 being extracted as liquid phase from the first separation drum 13. So that these two partial streams can be brought to common pressure and temperature level and conveyed to the second compression stage of the second compressor.

Furthermore, this setup clearly improves the control over the flue gas condensation. With adjustment of the flow rate over the $CO_2$ pump 35 the driving force for heat transfer, the Logarithmic Mean Temperature Difference (LMTD), is varied. In this way the performance of the second separation stage 21 can be adjusted. This is especially important, when operating at condensation temperatures near the sublimation and freezing point of $CO_2$.

In order to maximize the described effect, the heat recovery out of the offgas from separation can be increased by having the vent gas recirculated to the cold box, after expansion, at least once before releasing it to the atmosphere.

Table of flags, pressures and temperatures.

| Flag no. | Temperature, approx. [° C.] | Pressure, approx. [bar] |
|---|---|---|
| 1 | 13 | 35.7 |
| 2 | 13 | 35 |
| 3 | — | — |
| 4 | — | — |
| 5 | −19 | 34.7 |
| 6 | −50 | 34.3 |
| 7 | −53° C. | 5 to 10 |
| 7a | −54 | 27 |
| 7b | −54 | 5 to 10 |
| 7c | −54 | 15.5 |
| 7d | −54 | 5 to 10 |
| 7e | −45 | ≈20 to 23 |
| 7f | −45 | 20 |
| 8 | −47 | 16.5 |
| 9 | −47 | 16.5 |
| 10 | −22 to −29 | 18.4 |
| 11 | 25 | 18 |
| 12 | −7 | 5-10 |
| 13 | −22 to −29 | 20 |
| 14 | −22 to −29 | 5-10 |
| 15 | — | |
| 16 | 26 to 30 | 26 |
| 17 | 80 to 100 | 25.8 |
| 18 | −54 | 2.3 |
| 19 | 80 to 130 | 60 to 110 |

The tolerances for the temperatures are ±5° C. The tolerances for the pressures are ±5 bar While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for producing liquid $CO_2$ product out of combustion flue gas, the method comprising:
   partially condensing the flue gas in sequence through at least two separation stages to form a two phase mixture of an off gas to be vented and a liquid $CO_2$ stream;
   separating the off gas to be vented from the liquid $CO_2$ stream in at least the last separation stage;
   wherein the off gas to be vented and the liquid $CO_2$ stream are expanded and the at least two separation stages are cooled by the expanded off gas to be vented and the expanded liquid $CO_2$; and
   wherein the expanded liquid $CO_2$ is further separated after having passed the last separation stage of the at least two separation stages in an additional separation drum; and
   wherein the liquid $CO_2$ moving out of the additional separation drum is split into a part of the liquid $CO_2$ and a remainder of the liquid $CO_2$; and
   wherein gaseous $CO_2$ moving out of the additional separation drum and the part of the liquid $CO_2$ moving out of the additional separation drum are expanded to a first pressure level for cooling the last separation stage; and
   wherein the pressure of the remainder of the liquid $CO_2$ moving out of the additional separation drum is raised to a second pressure level and the remainder of the liquid $CO_2$ moving out of the additional separation drum is then expanded for cooling the $CO_2$ in the at least two separation stages and conveyed to a compression stage of a multistage compressor; and
   wherein the gaseous $CO_2$, the part of the liquid $CO_2$ moving out of the additional separation drum, and the remainder of the liquid $CO_2$ moving out of the additional separation drum are compressed with the multi-stage-compressor to produce liquid $CO_2$.

2. The method according to claim 1, wherein the remainder of the liquid $CO_2$ moving out of the additional separation drum is expanded to a pressure of approximately 15 bar to 25 bar.

3. The method according to claim 1, wherein the liquid $CO_2$ from separation stage before the last separation stage is expanded to the pressure of the remainder of the liquid $CO_2$ moving out of the additional separation drum and the liquid $CO_2$ from the separation stage before the last separation stage and the remainder of the liquid $CO_2$ moving out of the additional separation drum are used for cooling purposes in the separation stage before the last separation stage.

4. The method according to claim 3, wherein the liquid $CO_2$ from the separation stage before the last separation stage and the remainder of the liquid $CO_2$ moving out of the additional separation drum are fed to a second or third stage of a multistage-compressor.

5. The method according to claim 1, wherein the flue gas is compressed in a first compressor, cooled in a first cooler and/or dried in a drier before entering a first separation stage of the at least two separation stages.

6. The method according to claim 1, wherein offgas from the last separation stage of the at least two separation stages is expanded to approximately 17 bar and resulting in a temperature of approximately −54° C. before entering a heat exchanger of the last separation stage of the at least two separation stages.

7. The method according to claim 1, wherein the offgas is superheated in a superheater after having passed all separation stages of the at least two separation stages and expanded in an expansion machine and subsequently fed again to a heat exchanger of the last separation stage of the at least two separation stages.

8. A plant for producing liquid $CO_2$ product out of combustion flue gas, comprising:
   at least two separation stages where the flue gas is partially condensed and divided into off gas to be vented and liquid $CO_2$ at least in a last separation stage thereof;
   pressure reducing valves configured to expand the off gas to be vented and the liquid $CO_2$; and
   wherein the at least two separation stages are arranged to be passed through in sequence by the flue gas and are cooled by the expanded off gas to be vented and by the expanded liquid $CO_2$;
   an additional separation drum configured and arranged to receive the expanded liquid $CO_2$ from the first expansion device and separate the expanded liquid $CO_2$ into liquid $CO_2$ and gaseous $CO_2$;
   a splitter wherein the liquid $CO_2$ moving out of the additional separation drum is split into a part of the liquid $CO_2$ and a remainder of the liquid $CO_2$, and wherein the gaseous $CO_2$ moving out of the additional separation drum and the part of the liquid $CO_2$ moving out of the additional separation drum are expanded to a first pressure level for cooling the last separation stage;
   a pump and a pressure reducing valve, where the pressure of the remainder of the liquid $CO_2$ moving out of the additional separation drum is raised to a second pressure level and expanded for cooling the last separation stage of the at least two separation stages; and
   a multistage compressor, wherein a stage of the multistage compressor is configured and arranged to compress the gaseous $CO_2$ moving out of the additional separation drum, the part of the liquid $CO_2$ moving out of the additional separation drum and the remainder of the liquid $CO_2$ moving out of the additional separation drum to produce liquid $CO_2$.

9. The plant according to claim 8, wherein each separation stage of the at least two separation stages comprises a heat exchanger and a separation drum for separating liquid $CO_2$ from gaseous $CO_2$.

10. The plant according to claim 8, further comprising at least one expansion machine and/or at least one offgas superheater.

11. The plant according to claim 8, further comprising a first compressor, a first cooler, and a drier.

* * * * *